US008937964B2

(12) United States Patent
Magill et al.

(10) Patent No.: US 8,937,964 B2
(45) Date of Patent: Jan. 20, 2015

(54) APPARATUS AND METHOD TO SWITCH PACKETS USING A SWITCH FABRIC WITH MEMORY

(75) Inventors: Robert B. Magill, Fairfax, VA (US); Kenneth P. Laberteaux, Ann Arbor, MI (US)

(73) Assignee: Tellabs Operations, Inc., Naperville, IL (US)

(*) Notice: Subject to any disclaimer, the term of this patent is extended or adjusted under 35 U.S.C. 154(b) by 1855 days.

(21) Appl. No.: 10/606,753

(22) Filed: Jun. 27, 2003

(65) Prior Publication Data
US 2004/0081184 A1   Apr. 29, 2004

Related U.S. Application Data

(60) Provisional application No. 60/392,422, filed on Jun. 27, 2002.

(51) Int. Cl.
*H04L 12/54* (2013.01)
*H04L 12/935* (2013.01)
*H04L 12/937* (2013.01)
*H04L 12/931* (2013.01)

(52) U.S. Cl.
CPC ........ *H04L 49/3036* (2013.01); *H04L 49/3027* (2013.01); *H04L 49/3045* (2013.01); *H04L 49/254* (2013.01); *H04L 49/30* (2013.01); *H04L 49/3072* (2013.01); *H04L 49/503* (2013.01)
USPC .......................................... 370/413; 370/429

(58) Field of Classification Search
USPC ......... 370/412, 413, 414, 415, 416, 389–401, 370/395.51, 395.52, 395.53
See application file for complete search history.

(56) References Cited

U.S. PATENT DOCUMENTS

| | | | | |
|---|---|---|---|---|
| 5,199,028 | A | * | 3/1993 | Arnold .......................... 370/418 |
| 5,832,303 | A | * | 11/1998 | Murase et al. .................. 710/36 |
| 5,905,725 | A | * | 5/1999 | Sindhu et al. .................. 370/389 |
| 6,195,335 | B1 | * | 2/2001 | Calvignac et al. ............ 370/236 |
| 6,351,466 | B1 | * | 2/2002 | Prabhakar et al. ............ 370/413 |
| 6,449,283 | B1 | * | 9/2002 | Chao et al. ..................... 370/461 |
| 6,487,213 | B1 | * | 11/2002 | Chao ............................. 370/418 |
| 6,493,347 | B2 | * | 12/2002 | Sindhu et al. ................. 370/401 |

(Continued)

FOREIGN PATENT DOCUMENTS

EP           0 785 698 A2    7/1997

OTHER PUBLICATIONS

Zhang, "Service Disciplines for Guaranteed Performance Service in Packet-Switching Networks", Oct. 31, 1995, Proceedings of the IEEE, p. 1374-1396.*
Chuang et al., "Matching Output Queueing With a Combined Input/Output-Queued Switch," IEEE Journal on Selected Areas in Communications, vol. 17, No. 6, pp. 1030-1039, (Jun. 1999).
Stoica et al., "Exact Emulation of an Output Queueing Switch by a Combined Input Output Queueing Switch," presented at $6^{th}$ IEEE/IFIP IWQoS, pp. 218-224, (1998).

(Continued)

*Primary Examiner* — Brian O'Connor
(74) *Attorney, Agent, or Firm* — Hamilton, Brook, Smith & Reynolds, P.C.

(57) ABSTRACT

Packets having at least one cell are switched using input queues, output queues, a switch fabric, and a controller. Each input queue stores cells to be switched, and each output queue stores switched cells. The switch fabric couples the input queues to the output queues and has memory. The switch fabric stores cells moved from the input queues to the switch fabric and stores cells based on the output queues. The controller couples to the input queues and the switch fabric and determines input priorities for cells moving from the input queues to the switch fabric and output priorities for cells moving from the switch fabric to the output queues.

23 Claims, 3 Drawing Sheets

(56) References Cited

U.S. PATENT DOCUMENTS

| | | | | |
|---|---|---|---|---|
| 6,498,792 | B1* | 12/2002 | Johnson et al. | 370/388 |
| 6,519,225 | B1* | 2/2003 | Angle et al. | 370/229 |
| 6,563,837 | B2* | 5/2003 | Krishna et al. | 370/413 |
| 6,822,958 | B1* | 11/2004 | Branth et al. | 370/390 |
| 6,885,591 | B2* | 4/2005 | Nong | 365/189.05 |
| 6,940,851 | B2* | 9/2005 | Oki et al. | 370/388 |
| 6,956,851 | B1* | 10/2005 | McKeown et al. | 370/369 |
| 6,961,342 | B1* | 11/2005 | Uzun et al. | 370/414 |
| 6,963,564 | B1* | 11/2005 | Liu | 370/389 |
| 7,042,848 | B2* | 5/2006 | Santiago et al. | 370/253 |
| 7,054,311 | B2* | 5/2006 | Norman et al. | 370/378 |
| 7,136,391 | B1* | 11/2006 | Yasukawa et al. | 370/416 |
| 7,145,904 | B2* | 12/2006 | Zhao et al. | 370/371 |
| 7,154,885 | B2* | 12/2006 | Nong | 370/380 |
| 7,177,314 | B2* | 2/2007 | Wu et al. | 370/395.51 |
| 7,203,193 | B2* | 4/2007 | Hoof | 370/389 |
| 7,206,325 | B2* | 4/2007 | Nong | 370/474 |
| 7,212,528 | B2* | 5/2007 | Kuhl et al | 370/389 |
| 7,260,102 | B2* | 8/2007 | Mehrvar et al. | 370/412 |
| 7,477,652 | B2* | 1/2009 | Medina et al. | 370/413 |
| 7,680,045 | B2* | 3/2010 | Van Wageningen et al. | 370/232 |
| 2003/0048792 | A1* | 3/2003 | Xu et al. | 370/400 |
| 2003/0103500 | A1* | 6/2003 | Menon et al. | 370/389 |
| 2003/0123469 | A1* | 7/2003 | Nong | 370/412 |
| 2003/0174701 | A1* | 9/2003 | Angle et al. | 370/390 |

OTHER PUBLICATIONS

Rojas-Cessa et al., "CIXB-1: Combined Input-One-Cell Crosspoint Buffered Switch," Proc. 2001 IEEE Workshop on High Performance Switching and Routing, pp. 324-329, (May 2001).

Rojas-Cessa et al., "CIXOB-k: Combined Input-Crosspoint-Output Buffered Packet Switch," Proc. IEEE Globecom 2001, pp. 2654-2660, (Dec. 2001).

Elhanay et al., "A Contention-Free Tbit/s Packet-Switching Architecture for ATM Over WDM Networks," IEICE Trans. Commun., vol. E83-B, No. 2, pp. 225-230, (Feb. 2000).

Chao et al., "Delay-Bound Guarantee in Combined Input-Output Buffered Switches," Proc. IEEE GLOBECOM 2000, pp. 515-524, (Nov. 2000).

Donpaul C. Stephens et al., "Implementing Distributed Packet Fair Queueing in a Scalable Switch Architecture", Proc. IEEE INFOCOM 1998, pp. 282-290, Apr. 1998.

Masayoshi Nabeshima, "Performance Evaluation of a Combined Input- and Crosspoint-Queued Switched", IEICE Trans. Commun., vol. E83-B, No. 3, Mar. 2000.

International Search Report, PCT/US03/20058, mailed Jan. 3, 2008.
Supplementary European Search Report, EP 03 76 2043, completed Jan. 20, 2010.
Examiner's Communication (Can), 2490915 dated Mar. 9, 2010.
Office Action, EP 0 3762043.2, dated Mar. 18, 2010.

* cited by examiner

US 8,937,964 B2

APPARATUS AND METHOD TO SWITCH PACKETS USING A SWITCH FABRIC WITH MEMORY

CROSS-REFERENCE TO RELATED APPLICATIONS

This application claims the priority of U.S. provisional patent application 60/392,422, filed Jun. 27, 2002, which is incorporated herein by reference.

TECHNICAL FIELD OF THE INVENTION

The present invention relates in general to communications networks and more particularly to apparatuses and methods for scheduling packets in packet switching devices.

BACKGROUND OF THE INVENTION

For the convenience of the reader, the publications referred to herein are listed below. As used herein, the numerals within parentheses refer to the respective publications. The listed publications are incorporated herein by reference.
(1) D. Stephens and H. Zhang, "Implementing Distributed Packet Fair Queueing in a Scalable Switch Architecture," *Proc. IEEE INFOCOM* 1998, pp. 282-290, April 1998.
(2) M. Nabeshima, "Performance evaluation of a combined input- and crosspoint-queued switch," *IEICE Trans. Commun.*, Vol. E83-B, No. 3, March 2000.
(3) R. Rojas-Cessa, E. Oki, and H. J. Chao, "CIXOB-k: Combined Input-Crosspoint-Output Buffered Packet Switch," *Proc. IEEE Globecom* 2001, December 2001.
(4) S -T. Chuang, A. Goel, N. McKeown and B. Prabhakar, "Matching Output Queueing with a Combined Input Output Queued Switch," *IEEE JSAC*, vol. 17, no. 6, pp. 1030-1039, June 1999.
(5) I. Stoica and H. Zhang, "Exact Emulation of an Output Queueing Switch by a Combined Input Output Queueing Switch," presented at $6^{th}$ IEEE/IFIP IWQoS 1998, Napa, Calif., 1998.

Packet switching devices are interconnected to create a packet switched communication network. Packet switching devices transfer data packets from the input lines, or input ports, of the device to the output lines, or output ports. A packet switch fabric provides the data paths and functionality needed to transfer the packets from the input ports to the appropriate output ports. There are a variety of architectures appropriate for a packet switching device. Output queued (OQ) packet switch architectures are generally considered the ideal architecture in terms of quality of service (QoS) support. This means that the QoS characteristics (delay, loss, throughput, etc.) given to packets in a data flow by an OQ switch architecture can be equal or better than any competing architecture. However, the OQ switch architecture can be rather expensive to build for devices with fast line rates or with many input and output ports. Thus, other less expensive designs are often desired.

An OQ packet switch can provide QoS guarantees to individual data flows or to groups of flows. In an OQ packet switch, data arriving to an input port of the switch fabric is, for example, immediately transferred to the appropriate output port. The data paths of the switch fabric support the simultaneous transfer of a packet from every input port to any output port. Packets are queued at the appropriate output ports until they leave the device. Thus, an N×N OQ switch (that is, an OQ switch with N input and N output ports) can be modeled as N separate multiplexers, one for each output port, and packets experience contention only from other packets destined for the same output. There are many packet schedulers that provide delay and throughput guarantees to data flows in a multiplexing environment. These schedulers are utilized at the output ports to produce a high-performance switch architecture.

Unfortunately, OQ switches are expensive to build for large N or for high-speed data lines. The high cost results from the fact that the memory associated with each output port must store up to N newly arrived packets and retrieve one outgoing packet in a packet time. Thus, if C represents the input and output port speed in bits/second, the memory at each output port must be able to process C×(N+1) bits/second. OQ switch architectures are generally possible for switch sizes with a total throughput, C×N, less than 60 Gbit/s.

It is possible to reduce the capacity requirements (and often the access speed requirements) of the output port memory through a switch design that combines input queueing with a limited amount of memory in the switch fabric. A fabric containing speedup requires output queueing as well. Flow-control is needed to insure the limited fabric buffers do not overflow. We refer to this architecture as a combined input, fabric and output queued (CIFOQ) switch. The Tellabs® 6400 and Tellabs® 6500 systems sold by Tellabs, Inc. of Naperville, Ill. USA, for example, have this architecture. For the CIFOQ switch, a combination of flow-control from the fabric to the line cards, sophisticated bandwidth allocation and complex scheduling at the input line cards is used to give good overall system performance. The performance, however, can often fall far short of the OQ switch. For example, various industry approaches for the CIFOQ architecture have throughput and delay guarantee limitations (see (1)-(3)).

SUMMARY OF THE INVENTION

The present invention addresses the problems with the prior art by enabling and providing for a less expensive switch design (such as, for example, an architecture with limited fabric memory, with flow-control and with buffering on the input and output line cards) that can produce substantially the same, if not exactly the same, performance as can an OQ packet switch.

The invention includes apparatuses and methods to switch packets using a switch design that contains memory in the switch fabric and at the input ports.

One apparatus of the invention includes an apparatus to switch packets having at least one cell. The apparatus includes input queues, output queues, a switch fabric, and a controller. Each input queue stores cells to be switched, and each output queue stores switched cells. The switch fabric couples the input queues to the output queues and has memory. The switch fabric stores cells moved from the input queues to the switch fabric and stores cells based on the output queues. The controller couples to the input queues and the switch fabric and determines input priorities for cells moving from the input queues to the switch fabric and output priorities for cells moving from the switch fabric to the output queues.

Another apparatus of the invention includes an apparatus to switch packets, where each packet comprises at least one cell. The apparatus includes: input queues, where each input queue stores cells to be switched; output queues, where each output queue stores switched cells; a switch fabric coupling the input queues to the output queues, where the switch fabric has memory, stores cells moved from the input queues to the switch fabric, and stores cells based on the output queues; and a controller transferring highest priority cells in the switch fabric from the switch fabric to the output queues, transferring highest priority cells available for transfer in the input queues from the input queues to the switch fabric, prioritizing arriving cells in the input queues based on times of the arriving cells to depart, and updating cells in the input queues available for transfer to the switch fabric.

One method of the invention includes a method to switch packets in a time slot, where each packet comprises at least one cell. The method includes: selecting and transferring highest priority cells stored in memory of a switch fabric from the switch fabric to output queues; updating flow-control information of the switch fabric; selecting and transferring highest priority cells stored in input queues from the input queues to the memory of the switch fabric based on the flow-control information; and updating the flow-control information of the switch fabric.

BRIEF DESCRIPTION OF THE DRAWINGS

The foregoing and other features and advantages of the invention will be apparent from the following, more particular description of the embodiments of the invention, as illustrated in the accompanying drawings. The left most digits in the corresponding reference number indicate the drawing in which an element first appears.

DESCRIPTION OF EXEMPLARY
EMBODIMENTS OF THE PRESENT
INVENTION

Exemplary embodiments of the invention are discussed in detail below. While specific exemplary embodiments are discussed, it should be understood that this is done for illustration purposes only. A person skilled in the relevant art will recognize that other components and configurations can be used without parting from the spirit and scope of the invention. The embodiments and examples discussed herein are non-limiting examples.

Disclosed herein are exemplary apparatuses and methods for scheduling packets in packet switching devices, including, for example, packet switching devices having memory in the switch fabric. The present invention can be applicable to, for example, products having a packet switch fabric, such as an Internet protocol (IP) router, an asynchronous transfer mode (ATM) switch, an Ethernet switch or a packet-based multi-service provisioning platform (MSPP) device for instance. The present invention provides better performance for a CIFOQ switch architecture than prior scheduling and bandwidth allocation apparatuses and methods.

Figure 1:
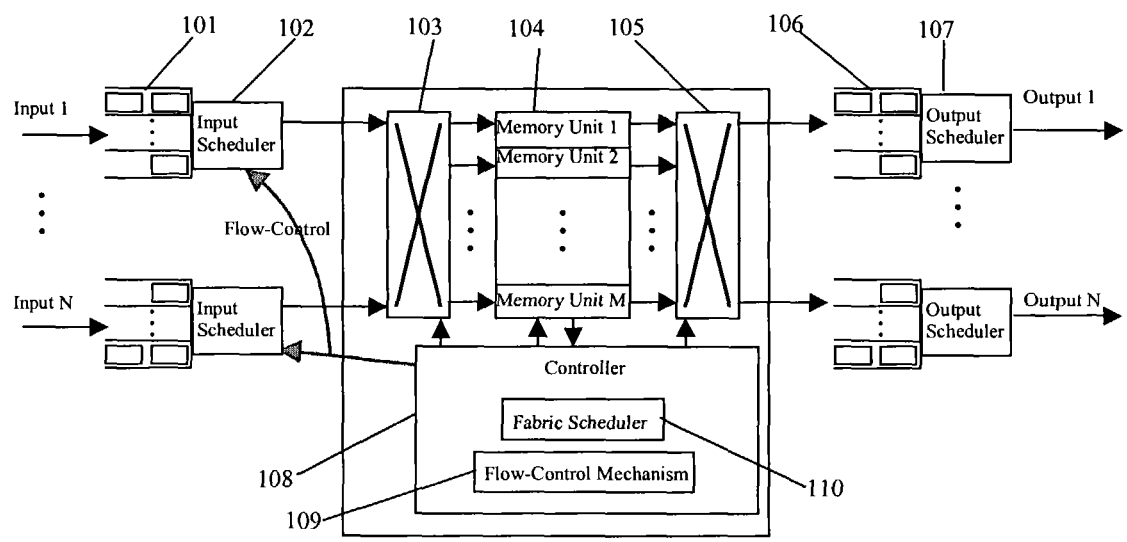
FIG. 1 illustrates a CIFOQ switch architecture of the invention.

FIG. 1 illustrates a CIFOQ switch architecture of the invention. The architecture includes input queues 101, input schedulers 102, a fabric memory write control 103, a switch fabric memory 104, fabric memory read control 105, output queues 106, output schedulers 107 and a controller 108. The switch fabric includes at least the switch fabric memory 104. Each of the N sets of input queues 101 is coupled to one of the N input ports. Each of the N input schedulers 102 is coupled to one of the N sets of input queues 101 and to the corresponding input port. The input schedulers 102 are coupled to the fabric memory write control 103. The fabric memory write control 103 is coupled to the switch fabric memory 104. The switch fabric memory 104 is coupled to the fabric memory read control 105. The fabric memory read control 105 is coupled to the output queues 106. Each of the N sets of output queues 106 is coupled to an output scheduler 107. Each of the N sets of output queues 106 and one of the output schedulers 107 is coupled to one of the N output ports. A controller 108 is coupled to the input schedulers 102, the fabric memory write control 103, the switch fabric memory 104, and the fabric memory read control 105.

One embodiment of the invention assumes that time is slotted, and that data moves through the switch shown in FIG. 1 in fixed size units called cells. If data arrives to the switch in variable length packets, these packets are segmented into cells at the inputs and reassembled into packets before leaving. (These functions are not illustrated in the architecture of FIG. 1.) It is further assumed, as is standard, that at most one cell arrives to an input port in a timeslot and at most one cell leaves an output port in a timeslot.

The switch fabric memory 104 may be completely shared or partitioned. Shared memory architectures for the switch fabric memory 104 include either one or multiple (M) memory units where all memory locations are completely shared. Partitioned memory architectures for the switch fabric memory 104 include multiple memory units dedicated for specific data. For partitioned memory, the memory units, for example, can be dedicated to cells for specific output ports or to cells from specific input/output port pairs.

The controller 108 provides flow-control to each input scheduler 102. The controller 108 includes a flow-control mechanism 109, and a fabric scheduler 110 to coordinate the input schedulers 102, the memory write control 103, the switch fabric memory 104, and the memory read control 105. Without loss of generality, the input schedulers 102 are considered part of the controller 108 and can be located at the input ports or in the switch fabric. Each input scheduler 102 determines the order for cells entering each input line of the fabric memory write control 103, where the cells are stored in a limited switch fabric memory 104. The flow-control mechanism 109 regulates the flow of cells between the input queues 101 and the switch fabric memory 104. Each input scheduler 102 sends a cell queued at the input queues 101 to the switch fabric memory 104 only if permission is given by the flow-control mechanism 109. The fabric scheduler 110 determines the order for cells leaving the switch fabric memory 104 on each output line of the fabric memory read control 105 to the output queues 106.

It is assumed that an arriving cell requires at least two scheduling operations to reach the output queues: one operation where an input scheduler 102 moves the cell from the input queues 101 to the switch fabric (known as input scheduling); and one operation where the fabric scheduler 110 moves the cell from the switch fabric to the output queues 106 (known as fabric scheduling). The invention covers embodiments where fabric scheduling and input scheduling occur simultaneously or sequentially. For sequential embodiments, input scheduling may occur prior to fabric scheduling or vice-versa. A scheduling phase refers to the combination of an input scheduling operation and a fabric scheduling operation.

Figure 2:
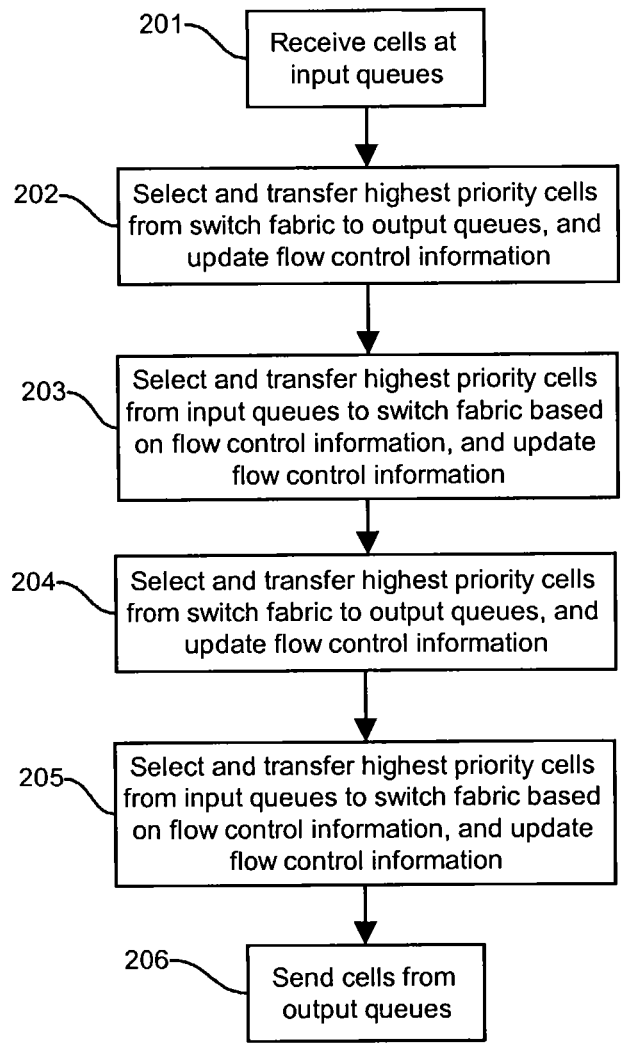
FIG. 2 illustrates a flowchart for the CIFOQ switch architecture of the invention

FIG. 2 illustrates a flowchart for the CIFOQ switch architecture of the invention where fabric scheduling occurs prior to input scheduling and the fabric contains two times speedup. In block 201, the cells are received in the input queues 101 for the timeslot.

In block 202, the switch fabric scheduler selects the highest priority cell for each output port that is contained in the switch fabric memory 104 and transfers these cells from the switch fabric memory 104 to the output queues 106, and flow-control information maintained by the flow-control mechanism 109 is updated.

In block 203, each of the N input schedulers 102 selects the highest priority cell contained in the coupled input queues and permitted by the flow-control mechanism 109, transfers these cells from the input queues 101 to the switch fabric memory 104, and the flow-control information maintained by the flow-control mechanism 109 is updated.

In block 204, the switch fabric scheduler selects the highest priority cell for each output port that is contained in the switch fabric memory 104 and transfers these cells from the switch fabric memory 104 to the output queues 106, and flow-control information maintained by the flow-control mechanism 109 is updated.

In block 205 each of the N input schedulers 102 selects the highest priority cell contained in the coupled input queues and permitted by the flow-control mechanism 109, transfers these cells from the input queues 101 to the switch fabric memory 104, and the flow-control information maintained by the flow-control mechanism 109 is updated.

In block 206, each output scheduler 107 selects a cell from the coupled output queues 106 and sends the selected cell on the output port for the timeslot.

FIG. 2 illustrates 2 times speed up. Blocks 202 and 204 are for fabric scheduling, and blocks 203 and 205 are for input scheduling. Blocks 202 and 203 are a first scheduling phase, and blocks 204 and 205 are a second scheduling phase. For embodiments having less than 2 times speed up, the two scheduling phases of blocks 202-205 cannot be available for every timeslot. In an embodiment having 1.5 times speed up, for example, both scheduling phases can occur for half of the number of timeslots while only one of the two scheduling phases can occur for the other half of the number of the timeslots. In an embodiment having 1 times speed up, one scheduling phase occurs for all timeslots.

Described herein by way of example are three sufficient conditions for the CIFOQ switch architecture of FIG. 1 with 2 times speedup to substantially, if not exactly, emulate an OQ switch. These conditions provide properties of the input schedulers 102, the flow-control mechanism 109, and the fabric scheduler 110 of the controller 108 that allow support for OQ switch emulation with 2 times speedup. If each condition is not met, the CIFOQ switch of FIG. 1 is not guaranteed to emulate an OQ switch.

Assume that the flow-control mechanism 109 produces a flow-control state vector $F=(f_1, f_2, \ldots, f_M)$ where each element, $f_i$, constitutes a binary state value (1=blocked, 0=available). The availability of a cell c, queued at the input queues 101, for transport to the switch fabric memory 104 is given by one particular $f_i$ value. One $f_i$ value, however, may determine the availability of multiple input queued cells in the input queues 101. If $f_i=1$, all cells queued at the input queues 101 that are regulated by $f_i$ are said to be blocked from moving to the switch fabric memory 104. If $f_i=0$, these cells are available for moving to the switch fabric memory 104. Before presenting the three sufficient conditions for OQ switch emulation, consider the following definitions.

Shadow OQ Switch—A model or imaginary OQ switch that receives the exact same input cells at every time instance as the CIFOQ switch. The shadow OQ switch then sends cells on its output ports according to a shadow OQ switch scheduling mechanism.

Time-to-Leave (TTL)—TTL(c)=The departure timeslot of cell, c, from the output queues 106 as specified by the shadow OQ switch.

Output Priority List (OPL)—The fabric scheduler 110 maintains an ordered list of all cells queued in the switch fabric memory 104 that are destined for a particular output port. An OPL is maintained for each output port. These cells are ordered according to their TTL in the shadow OQ switch.

Input Priority List (IPL)—Each input scheduler 102 maintains an ordered list of all cells still queued at the coupled set of input queues 101. The cells can be ordered according to a variety of input ordering schemes.

Output Cushion of cell c—OC(c)—Let γ be the number of cells at the destination output queues 106 for a cell c with TTL<TTL(c). OC(c)=γ+1.

Input Thread of cell c—IT(c)=The number of cells of equal (includes cell c) or higher priority than cell c on the IPL.

Slackness of cell c: L(c)=OC(c)−IT(c).

As discussed above, each scheduling phase is broken into two parts:

(1) Fabric Scheduling. The fabric scheduler 110 selects the highest priority cell from the OPL associated with each output port and transfers the selected cells to their output queues 106. The flow-control mechanism 109 updates the flow-control vector, F, and certain $f_i$ values may transition from blocked to available.

(2) Input Scheduling. Each input scheduler 102 selects the highest priority cell from its IPL whose associated flow-control state $f_i$ is available and transfers the selected cells to the switch fabric memory 104. The flow-control mechanism 109 updates the flow-control vector, F, and certain $f_i$ values may transition from available to blocked.

Thus, in each scheduling phase, the fabric scheduler 110 sends at most one cell queued in the switch fabric memory 104 to each set of output queues 106, and the input scheduler 102 selects an available cell to transfer from each set of input queues 101 to the switch fabric memory 104.

The following three scheduling and flow-control conditions, or properties, are sufficient for the CIFOQ switch to produce the exact same performance as the OQ switch. The CIFOQ switch is said to produce the exact same performance if, at every time instance, the cells selected by the output schedulers 107 are the same cells that depart the OQ switch.

The first condition is known as lowest time-to-leave (LTTL) fabric scheduling and defines the ordering of the OPL list by the fabric scheduler 110.

Condition 1: (LTTL fabric scheduling) Cells are ordered in each OPL maintained by the fabric scheduler 110 according to the lowest TTL.

With the first condition, the fabric scheduler 110 orders cells stored in the switch fabric memory 104 based on times of the cells to depart from the shadow OQ switch, where the cells having lower times of the cells to depart have higher output priorities.

The second condition is known as LTTL blocking, and the input schedulers 102 and the flow-control mechanism 109 combine to produce the property.

Condition 2: (LTTL blocking) If a flow-control state $f_i$ is set to full, there exists a cell in the switch fabric memory 104 with a lower TTL than all cells in the input queues 101 regulated by $f_i$.

With the second condition, the flow-control mechanism 109 determines whether the cells of the input queues 101 are blocked from moving to the switch fabric memory 104 or available for moving to the switch fabric memory 104. Cells in the input queues 101 and the switch fabric memory 104 have respective times of the cells to depart the shadow OQ switch and thus from the output queues 106. If cells are blocked from moving to the switch fabric memory 104 from the input queues 101, a cell in the switch fabric memory 104 has a lower time to depart than the cells being blocked. The input schedulers 102 move available cells from the input queues 101 to the switch fabric memory 104.

The third condition is known as non-negative slackness (NNS) insertion, and each input scheduler 102 inserts arriving cells in a position of the IPL of the input scheduler 102 according to this property.

Condition 3: (NNS insertion) An arriving cell is inserted in the IPL of an input scheduler 102 with non-negative slackness.

With the third condition, each input scheduler 102 determines an input priority for a cell arriving at a respective input queue 101 based on: a time of the cell to depart from a respective output queue 106; and the times of the cells in the respective output queue to depart from the respective output queue 106.

Thus, the fabric scheduler 110 transfers the lowest TTL cell queued in the switch fabric memory 104 for each output port from the switch fabric memory 104 to the output queues 106 of the output port. Likewise, the input scheduler 102 chooses the highest priority cell on the IPL of the associated input queues 101 whose associated flow-control element is available and transfers the selected cell from the input queue 101 to the switch fabric memory 104. The input scheduler 102 places a cell arriving at an input port in a position in the IPL for the input queues 101 of the input port such that the cell has NNS. The flow-control mechanism 109 updates the flow-control elements, as needed, when cells are transferred by the input schedulers 102 and the fabric scheduler 110.

With the invention, and assuming that each output scheduler 107 sends the LTTL cell contained in the associated output queues 106, a CIFOQ switch containing 2 times speedup that has LTTL fabric scheduling, LTTL blocking, and NNS insertion emulates an OQ switch.

Scheduling for a Buffered Crossbar Switch Fabric

Scheduling for a buffered crossbar switch fabric is discussed next. A buffered crossbar fabric is one type of CIFOQ fabric. Based on the above three conditions, specific scheduling mechanisms are provided for a buffered crossbar switch fabric to perform OQ switch emulation. In a buffered crossbar switch fabric, the fabric memory is completely partitioned among input/output port pairs. OQ switch emulation can be performed by a set of 2N schedulers (N input and N crosspoint schedulers, where the N crosspoint schedulers constitute the fabric scheduler 110), which are non-iterative and completely distributed. The flow-control mechanism 109 provides the only global coordination among the individual schedulers. Thus, a CIFOQ switch architecture with feasible scheduling and vastly reduced memory speeds can provide the same performance as an OQ switch.

Figure 3:
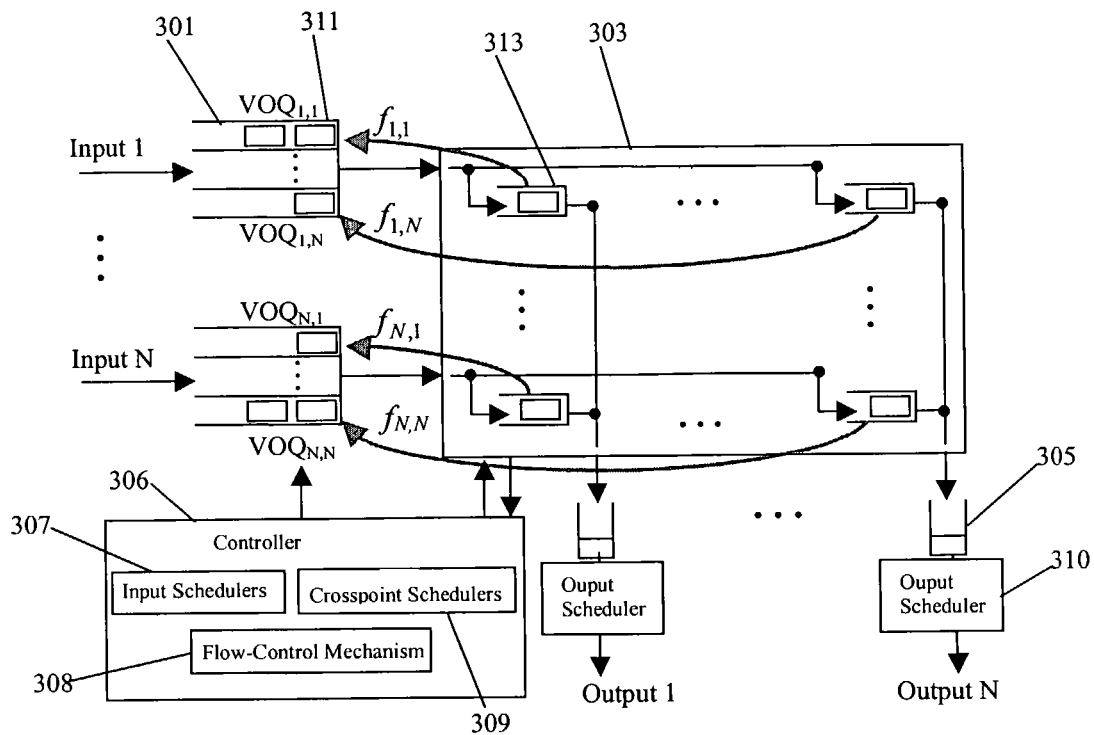
FIG. 3 illustrates a CIFOQ switch architecture of the invention having a buffered crossbar switch fabric.

FIG. 3 illustrates a CIFOQ switch architecture of the invention having a buffered crossbar switch fabric. The CIFOQ switch architecture includes input queues 301, a buffered crossbar switch fabric 303, and output queues 305. A controller 306 controls scheduling and flow in the input queues 301, and in the buffered crossbar switch fabric 303. The controller includes N input schedulers 307, a flow-control mechanism 308, and N crosspoint schedulers 309. The input schedulers can be located in the input port cards or in the switch fabric. Each set of output queues 305, one for each output port, contains an output scheduler 310.

The CIFOQ switch architecture has N input ports and N output ports, and the buffered crossbar switch fabric 303 is of size N×N. The input queues 301 (which are assumed to reside at the input ports) are logically divided into separate virtual output queues (VOQs) 311, with one VOQ 311 for each of the $N^2$ input/output link pairs in the switch fabric 303. Virtual output queue $VOQ_{i,j}$ holds cells arriving to input i and destined for output j. Thus, each cell c belongs to a specific VOQ, namely, the VOQ that holds cells that arrive on the same input port as c and that are destined to the same output port as c. Each crosspoint ($CP_{i,j}$) 313 of the switch fabric 303 is associated with a unique input/output pair of the switch fabric 303, namely, input i and output j. Thus, the cells in $VOQ_{ij}$ of the input queue 301 are sent to $CP_{i,j}$ of the switch fabric 303.

A flow-control state $f_{i,j}$ is associated with each $CP_{i,j}$. Flow-control state $f_{i,j}$ regulates the cells in $VOQ_{ij}$. Flow-control state $f_{i,j}$ is in state 1 if the crosspoint queue for $CP_{i,j}$ is blocked (i.e., full) and is in state 0 if the crosspoint queue for $CP_{i,j}$ is available (i.e., not full). As an option, the crosspoint queues in FIG. 3 can also represent a logical partitioning of a shared memory switch fabric where each input/output pair of the device is guaranteed a certain minimum portion of the memory of the switch fabric. When the number of cells for an input/output pair represented by the appropriate crosspoint queue $CP_{ij}$ reaches an allotted threshold, $f_{i,j}$ is set to 1. When the number of cells is below the threshold, $f_{i,j}$ is 0.

Assume that time is slotted and that arriving packets are segmented into fixed length internal cells. In each timeslot the scheduling operation consists of two separate phases: (1) crosspoint scheduling; and (2) input scheduling. Each output port has an associated crosspoint scheduler 309, and the N crosspoint schedulers 309 operate in parallel during the crosspoint scheduling phase. The crosspoint scheduler 309 for output port j maintains an OPL for the cells in crosspoints $\{CP_{i,j}:1 \leq i \leq N\}$, and sends the highest priority cell to the output port. The flow-control mechanism 308 updates the flow-control state for the chosen crosspoint buffer, and $f_{i,j}$ may transition from blocked to available. Similarly, each input port has an input scheduler 307, and the N input schedulers 307 operate in parallel during the input scheduling phase. The input scheduler 307 for input port i maintains an IPL for the cells in VOQs $\{VOQ_{i,j}:1 \leq j \leq N\}$. The input scheduler 307 sends the highest priority cell to the switch fabric 303 having an associated $f_{i,j}=0$ (available). The flow-control mechanism 308 updates the flow-control state, and $f_{i,j}$ may transition from available to blocked. The input scheduling phase may occur simultaneously with the crosspoint scheduling phase, or it may occur sequentially with the crosspoint scheduling phase. In a sequential operation, the input scheduling phase may precede crosspoint scheduling or vice-versa.

FIFO OQ Switch Emulation

First-in-first-out (FIFO) OQ switch emulation is discussed using a CIFOQ switch architecture having a buffered crossbar switch fabric, as illustrated in FIG. 3. The buffered crossbar switch with 2 times speedup will emulate an OQ switch if the three conditions above are satisfied. With FIFO OQ switch emulation, cells arriving to the input queues 301 are ordered in the shadow OQ switch based on when the cells arrived at the input queues 301. Thus, cells arriving at the input queues 301 earlier than other cells have a lower TTL.

To satisfy LTTL fabric scheduling, the crosspoint schedulers 309 must order the cells according to lowest TTL. This means the oldest cell destined for a particular output port has highest priority for that port. Thus, the crosspoint schedulers 309 use oldest cell first (OCF) scheduling with a tie-breaking technique to choose between simultaneous arrivals that are destined for the same output port. Thus, the OPL is ordered by OCF with an appropriate tie-breaker. Example tie-breaking techniques include: lowest input port number; and round robin (RR) on the input ports. The information needed by the tie-breaking technique can be contained within the cells of identical arrival timeslots.

The LTTL blocking condition can be satisfied by proper ordering in the IPL of the subsequence of cells belonging to a particular VOQ 311. If this subsequence of cells is ordered by TTL (i.e., order of arrival), the input scheduler 307 insures that a cell at the crosspoint 313 always has a lower TTL than all cells from the VOQ 311 that are queued at the input queue 301. Thus, whenever $f_{i,j}=1$, the cells in $CP_{i,j}$ have a lower TTL than all cells in $VOQ_{i,j}$. Therefore, if the subsequence of cells from the same VOQ in the IPL are ordered according to their TTL, the LTTL blocking condition is satisfied.

To produce proper ordering in the IPL, an arriving cell must be placed in the appropriate postion in the IPL list. This input insertion method must satisfy both the NNS slackness condition and the LTTL blocking condition. The following input insertion algorithm, which is similar to the group-by-virtual-output queue (GBVOQ) algorithm presented in (4) and (5), is used. Upon arrival, if the VOQ 311 is empty, the arriving cell is placed at the front of the IPL. Otherwise, the cell is placed in a position just behind the lowest priority cell in the IPL that belongs to the same VOQ 311 as the arriving cell. The input scheduler, one for each input port, then chooses the highest priority cell in the input port's IPL whose corresponding flow-control element, $f_{i,j}$ is set to 0. With this ordering of the IPL created by the preceding input insertion technique, both the NNS insertion condition and the LTTL blocking principal condition are satisfied. Thus, with OCF scheduling performed by each of the N crosspoint schedulers, the three conditions for OQ switch emulation are satisfied. This means that a buffered crossbar switch with 2 times speedup and output schedulers 310 that choose the OCF at each output port emulate a FIFO OQ switch.

The following describes an exemplary technique to implement the input schedulers 307 for FIFO OQ switch emulation. When a crosspoint buffer 313 is unavailable, no cells from the VOQ 311 are chosen. Thus, only one cell from each VOQ 311 needs to be tested by the input scheduler 307. This leads to the following exemplary implementation for the GBVOQ scheduler.

Let each input scheduler 307 maintain a reduced IPL (RIPL) that contains a list of at most N elements representing the backlogged VOQs 311 at the associated input port. Each input port also contains the N VOQs 311 shown in FIG. 3. An arriving cell is placed at the tail of its VOQ 311. If a VOQ entry exists in the RIPL list (i.e., the VOQ is backlogged), no change is made to the RIPL. If the cell arrived to an empty VOQ, the entry for this VOQ is placed at the head of the RIPL. When a cell is sent to the switch fabric 303 and the VOQ for the cell transitions from backlogged to empty, the VOQ entry is removed from the RIPL. The input scheduler 307 chooses the first VOQ entry on the RIPL whose associated crosspoint buffer 313 is available (i.e., $f_{i,j}=0$ for the VOQ). The head cell from this chosen VOQ is transmitted to the crosspoint buffer 313, and the flow-control states and the RIPL are updated.

The following pseudo code describes this exemplary input scheduler 307:

Upon arrival of a cell
    Put arriving cell at tail of VOQ;
    If (input VOQ for arriving cell is empty)
        Put VOQ entry at front of RIPL;
    Else
        No change to RIPL;
Done Upon Scheduling
    Choose first entry in RIPL with $f_{i,j}=0$;
    Transfer head cell from chosen VOQ;
    Update $f_{i,j}$;
    If (chosen VOQ is empty)
        Remove entry from RIPL;
    Else
        No change to RIPL;
Done General Non-FIFO OQ Switch Emulation General non-FIFO OQ switch emulation is discussed using a CIFOQ switch architecture having a buffered crossbar switch fabric and based on the FIFO OQ switch emulation. Compared to the FIFO OQ switch emulation, some additional functions are needed to emulate a general non-FIFO OQ switch.

Figure 4:
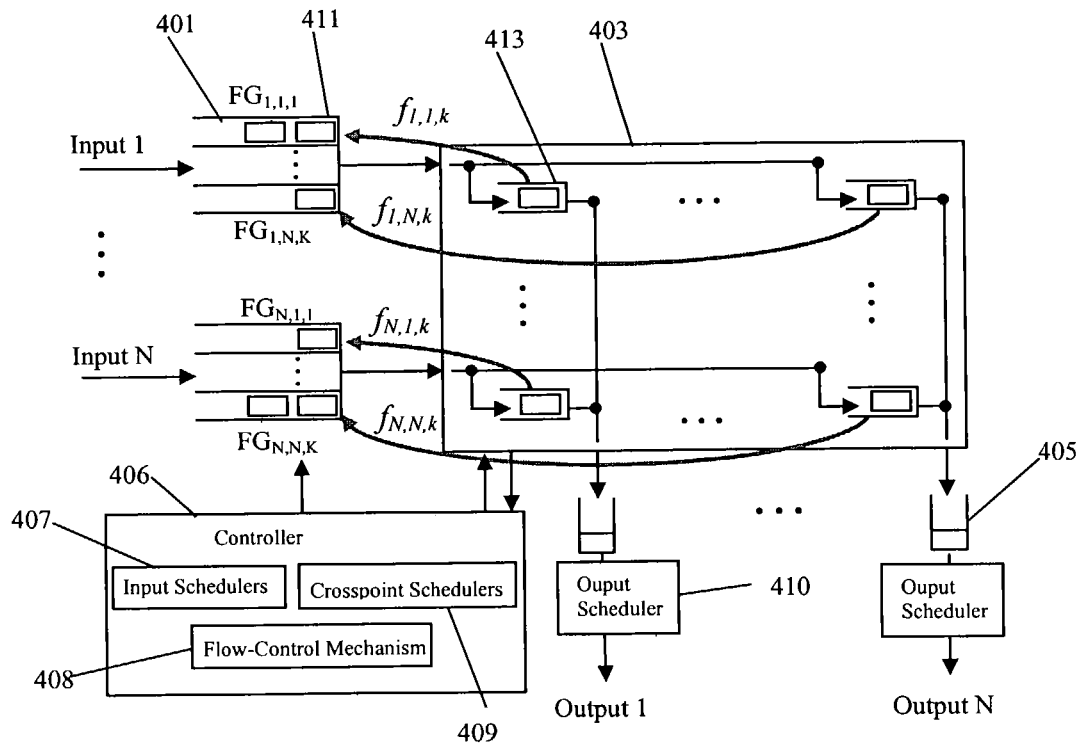
FIG. 4 illustrates a CIFOQ switch architecture of the invention having a buffered crossbar switch fabric and emulating a general non-FIFO OQ switch.

FIG. 4 illustrates a CIFOQ switch architecture of the invention having a buffered crossbar switch fabric and emulating a general non-FIFO OQ switch. FIG. 4 is generally the same as FIG. 3, with some additions. Compared to FIG. 3, the cells in $VOQ_{i,j}$ 311 of FIG. 3 are partitioned into K "FIFO-groups," $FG_{i,j,k}$ 411 in FIG. 4, where the cells in each FIFO-group represent a subsequence of cells in a particular VOQ that follow FIFO ordering in the OQ switch scheduling discipline. In other words, the particular non-FIFO OQ switch scheduler has specific properties such that cells belonging to the same FIFO group always leave the OQ switch in the same relative order that they arrived to the switch. $FG_{i,j,k}$ 411 in FIG. 4 where {k:1≤k≤K} represents a particular FIFO-group for $VOQ_{i,j}$ 311. Similarly, the memory at the crosspoint buffers 313 of FIG. 3 are partitioned such that each $FG_{i,j,k}$ has a dedicated buffer (or queue) $CP_{i,j,k}$ 413 at $CP_{i,j}$ that holds at least 1 cell. The flow-control vector $F=(f_{i,j,k})$ is defined as before, where $f_{i,j,k}$ regulates the cells in $FG_{i,j,k}$.

In order for the buffered crossbar fabric to emulate a general non-FIFO OQ switch, the three conditions described previously must be satisfied. The following describes an IPL ordering technique that allows the input schedulers 407 to produce non-FIFO OQ switch emulation in the buffered crossbar fabric of FIG. 4. This assumes that the crosspoint schedulers 409 satisfy the LTTL fabric scheduling condition. Thus, this IPL ordering technique allows the input schedulers 407 to satisfy the NNS insertion condition and the LTTL blocking property.

To satisfy the LTTL blocking condition for general non-FIFO OQ switch emulation, in the IPL, the subsequence of cells belonging to a $FG_{i,j,k}$ group are ordered according to TTL. By the definition of FIFO-group, TTL ordering for the cells in $FG_{i,j,k}$ is the same as the arrival order at the input port for the $FG_{i,j,k}$ cells. Partitioning the crosspoint buffers 413 into FIFO-groups and satisfying LTTL FIFO-group ordering in the IPL ensures that a cell in $CP_{i,j,k}$ has a smaller TTL than all cells in $FG_{i,j,k}$ at the input queue 401. Thus, when $f_{i,j,k}=1$, the LTTL blocking condition is satisfied.

The following exemplary input insertion technique satisfies the NNS condition and ensures the all cells in $FG_{i,j,k}$ are ordered according to TTL. For general non-FIFO OQ switch emulation, each input scheduler 407 maintains a RIPL that consists of one entry per backlogged FIFO-group. Thus, each RIPL is an ordered list of at most K·N FIFO-group entries. Each input port also has associated therewith the K·N FIFO-group queues, $FG_{i,j,k}$ 411. An arriving cell is placed at the tail of its $FG_{i,j,k}$ 411. If a FIFO-group entry exists in the RIPL list (i.e., the FIFO-group is backlogged), no change is made to the RIPL. If the cell arrived to an empty FIFO-group, the entry for this FIFO-group is placed at the head of the RIPL. When a cell is sent to the switch fabric 403 and the cell's FIFO-group transitions from backlogged to empty, the FIFO-group entry is removed from the RIPL. The input scheduler 407 chooses the first FIFO-group entry on the RIPL whose associated crosspoint buffer $CP_{i,j,k}$ 413 is available (i.e., $f_{i,j,k}=0$ for this FIFO-group). The head cell from this chosen $FG_{i,j,k}$ queue 411 is transmitted to the respective crosspoint buffer 413. The input scheduler 407 updates the RPL, and the flow-control mechanism 408 updates the flow-control state.

The following pseudo code describes this exemplary input scheduler 407:

```
Upon arrival of a cell
    Put arriving cell at tail of its FIFO-group queue;
    If (FIFO-group queue for arriving cell is empty)
        Put FIFO-group entry at front of RIPL;
    Else
        No change to RIPL;
Done
Upon Scheduling
    Choose first FIFO-group entry in RIPL with f_{i,j,k} = 0;
    Transfer head cell from FIFO-group;
    Update f_{i,j,k};
    If (chosen FIFO-group is empty)
        Remove FIFO-group entry from RIPL;
    Else
        No change to RIPL;
Done
```

For many non-FIFO scheduling disciplines (e.g., per-flow weighted fair queueing (WFQ), or weighted round robin (WRR)), a crosspoint scheduler 409 may not know the relative priority of two cells queued at the crosspoint buffers 413 without global knowledge of cells queued at the input queues 401. For these reasons, a shadow OQ switch may be needed to calculate the TTL of an arriving cell. The addition of a shadow OQ switch greatly increases complexity to the point where the system may become infeasible.

Strict Priority OQ Switch Emulation

A general non-FIFO scheduling discipline that does not require a shadow OQ switch is strict priority scheduling. Strict priority OQ switch emulation is discussed using a CIFOQ switch architecture having a buffered crossbar switch fabric and based on the general non-FIFO OQ switch emulation. For this embodiment, the FIFO-groups $FG_{i,j,k}$ 411, crosspoint buffers $CP_{i,j,k}$ 413, and the crosspoint schedulers 409 in FIG. 4 are defined for a strict priority scheduling discipline.

In an OQ switch with strict priority schedulers at each output port, there are K priority classes for each output port. A strict priority scheduler chooses the oldest cell from the highest backlogged priority class. A CIFOQ switch with 2 times speedup can be made to emulate the strict priority OQ switch. The FIFO-groups $FG_{i,j,k}$ 411 hold cells arriving on input i, destined for output j, and belonging to priority class k $\{k:1 \leq k \leq K\}$. The buffer crossbar switch fabric 403 has crosspoint buffers $CP_{i,j,k}$ 413 holding cells from $FG_{i,j,k}$ 411, and these cells are regulated by $f_{i,j,k}$ when moving from the input queues 401 to the switch fabric 403.

With strict priority OQ switch emulation, cells stored in the input queues 401 and the switch fabric 403 are ordered based on when the cells arrived at the input queues 401, respective output queues 404 for the cells, and FIFO groups 411 of the cells. Cells arriving at the input queues 401 earlier than other cells in the same FIFO groups have higher input and output priorities.

Strict priority OQ switch emulation occurs if the three conditions mentioned previously are satisfied. The LTTL fabric scheduling condition can be satisfied with a strict priority crosspoint scheduler 409. The strict priortity crosspoint scheduler 409 for output j chooses the oldest cell in crosspoints $CP_{i,j,k}$ $\{1 \leq i \leq N, 1 \leq k \leq K\}$ from the highest priority class. Assuming an arriving cell is stamped with the current timeslot and its priority, no information is needed from a shadow OQ switch to satisfy the LTTL fabric scheduling condition.

The NNS insertion condition and the LTTL blocking condition can be satisfied if the input scheduler 407 follows the exemplary pseudo code for the general non-FIFO OQ switch. Since cells from a FIFO-group are ordered by LTTL at the inputs, cells at the crosspoint buffers 413 have a lower TTL than the cells in the corresponding input FIFO-group 411, which means that the LTTL blocking condition is upheld. The NNS insertion condition can be satisfied by using the exemplary input insertion technique described by the pseudo code for the general non-FIFO OQ switch.

Various features of the example embodiments described herein can be implemented in hardware, software, or a combination of hardware and software. Moreover, although certain embodiments of the present invention have been described and illustrated herein, it will be readily apparent to those of ordinary skill in the art that variations, modifications and substitutions can be made to the embodiments disclosed and described herein without departing from the true spirit and scope of the invention.

What is claimed is:

1. An apparatus to switch packets, each packet including at least one cell, the apparatus comprising:
   a plurality of input queues, each input queue storing cells to be switched;
   a plurality of output queues, each output queue storing switched cells;
   a switch fabric coupling said input queues to said output queues, said switch fabric having memory, said switch fabric storing cells moved from said input queues to said switch fabric, said switch fabric storing cells based on said output queues, said switch fabric storing flow control state information; and
   a controller coupled to said input queues and said switch fabric, said controller determining input priorities for cells moving from said input queues to said switch fabric and output priorities for cells moving from said switch fabric to said output queues, said controller configured to update said flow-control state information of said switch fabric based on whether or not a cell exists in said switch fabric memory with a lower TTL than all queued cells being regulated by said flow-control state information.

2. An apparatus as in claim 1, wherein said controller orders cells stored in said switch fabric based on times of said cells to depart, wherein cells having lower times of said cells to depart have higher output priorities.

3. An apparatus as in claim 1, wherein said controller determines whether cells of said input queues are blocked from moving to said switch fabric, wherein cells of said input queues have respective times of said cells to depart, wherein cells of said switch fabric have respective times of said cells to depart, wherein if cells are blocked from moving to said switch fabric, a cell in said switch fabric has a lower time to depart than said cells being blocked.

4. An apparatus as in claim 1, wherein said controller determines an input priority for a cell arriving at a respective input queue based on a time of said cell to depart from a respective output queue and times of cells of said respective output queue to depart from said respective output queue.

5. An apparatus as in claim 1, wherein said controller determines said input priority and said output priority based on lowest time-to-leave switch fabric scheduling, lowest time-to-leave blocking, and non-negative slackness insertion.

6. An apparatus as in claim 1, wherein said switch fabric is a buffered crossbar switch fabric.

7. An apparatus as in claim 1, wherein said apparatus emulates at least one of an output queued packet switch, a first-in-first-out output queued packet switch, a general non-first-in-first-out output queued packet switch, and a strict priority output queued packet switch.

8. An apparatus as in claim 1, wherein the controller is further configured to determine an availability of a cell, queued at said input queues, for transport to said switch fabric memory, and further wherein the availability is given by one particular flow control element's state value of said flow-control state information.

9. An apparatus as in claim 1, wherein to update said flow-control state information, the controller is further configured to transition at least one flow-control element of said flow-control state information from one flow-control state value to another flow-control state value.

10. An apparatus to switch packets, each packet comprising at least one cell, comprising:
- a plurality of input queues, each input queue storing cells to be switched;
- a plurality of output queues, each output queue storing switched cells;
- a switch fabric coupling said input queues to said output queues, said switch fabric having memory, said switch fabric storing cells moved from said input queues to said switch fabric, said switch fabric storing cells based on said output queues; and
- a controller transferring highest priority cells in said switch fabric from said switch fabric to said output queues, transferring highest priority cells available for transfer in said input queues from said input queues to said switch fabric, prioritizing arriving cells in said input queues based on times of said arriving cells to depart, and updating cells in said input queues available for transfer to said switch fabric, the controller including a flow control mechanism configured to regulate flow of cells between said input queues and said switch fabric memory by producing flow-control state information based on whether or not a cell exists in said switch fabric memory with a lower TTL than all queued cells being regulated by said flow-control state information.

11. An apparatus as in claim 10, wherein said controller updating cells includes updating cells after highest priority cells in said switch fabric are transferred from said switch fabric to said output queues and after highest priority cells available for transfer in said input queues are transferred from said input queues to said switch fabric.

12. An apparatus as in claim 10, wherein said controller prioritizing arriving cells is further based on times of cells of said output queues to depart from said output queues.

13. An apparatus as in claim 10, wherein said controller includes a plurality of input schedulers and a fabric scheduler.

14. An apparatus as in claim 13, further wherein the flow control mechanism updates flow control elements, as needed, when cells are transferred by the input schedulers and the fabric scheduler.

15. An apparatus as in claim 10, wherein said fabric scheduler includes a plurality of crosspoint schedulers.

16. An apparatus as in claim 10, wherein each of said input queues includes a plurality of virtual output queues.

17. An apparatus as in claim 16, wherein said fabric switch includes a plurality of crosspoint buffers, said crosspoint buffers associated with respective virtual output queues.

18. An apparatus as in claim 10, wherein each of said input queues includes first-in-first-out groups.

19. An apparatus as in claim 18, wherein said fabric switch includes a plurality of crosspoint buffers, each said crosspoint buffer comprising first-in-first-out groups.

20. An apparatus as in claim 10, wherein the controller is further configured to determine an availability of a cell, queued at said input queues, for transport to said switch fabric memory, and further wherein the availability is given by one particular flow control element's state value of said flow-control state information.

21. A method to switch packets in a time slot, each packet comprising at least one cell, comprising:
 (a) selecting and transferring highest priority cells stored in memory of a switch fabric from said switch fabric to output queues;
 (b) updating flow-control state information of said switch fabric based on whether or not a cell exists in said switch fabric memory with a lower time-to-leave (TTL) than all queued cells being regulated by said flow-control state information;
 (c) selecting and transferring highest priority cells stored in input queues from said input queues to said memory of said switch fabric based on said flow-control state information; and
 (d) updating said flow-control state information of said switch fabric based on whether or not said cell exists in said switch fabric memory with said lower TTL than all queued cells being regulated by said flow-control state information.

22. A method as in claim 21, wherein cells are stored in said input queues according to input priorities, and wherein cells are stored in said memory of said switch fabric according to output priorities.

23. A method as in claim 21, wherein each timeslot further includes repeating (a) to (d).

* * * * *